United States Patent
Kumhyr

(12)
(10) Patent No.: US 6,493,735 B1
(45) Date of Patent: Dec. 10, 2002

(54) METHOD SYSTEM AND COMPUTER PROGRAM PRODUCT FOR STORING BI-DIRECTIONAL LANGUAGE DATA IN A TEXT STRING OBJECT FOR DISPLAY ON NON-BIDIRECTIONAL OPERATING SYSTEMS

(75) Inventor: David Bruce Kumhyr, Fuguay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,815

(22) Filed: Dec. 15, 1998

(51) Int. Cl.$^7$ ............................ G06F 17/30; G06F 17/21
(52) U.S. Cl. ........................................ 707/536; 345/703
(58) Field of Search ............................ 707/536, 103 Y; 345/703

(56) References Cited

U.S. PATENT DOCUMENTS

| | | | | |
|---|---|---|---|---|
| 5,572,668 A | * | 11/1996 | See et al. ....................... | 714/38 |
| 5,613,122 A | * | 3/1997 | Burnard et al. ................. | 713/1 |
| 5,623,657 A | * | 4/1997 | Conner et al. .............. | 709/303 |
| 5,754,173 A | * | 5/1998 | Hiura et al. ................ | 345/333 |
| 5,778,213 A | * | 7/1998 | Shakib et al. ............... | 395/500 |
| 5,784,069 A | * | 7/1998 | Daniels et al. ............. | 345/467 |
| 5,784,071 A | * | 7/1998 | Tang et al. .................. | 345/467 |
| 5,793,381 A | * | 8/1998 | Edberg et al. .............. | 345/467 |
| 5,802,539 A | * | 9/1998 | Daniels et al. ............. | 707/542 |
| 5,812,122 A | * | 9/1998 | Ng ............................. | 345/326 |
| 5,812,964 A | | 9/1998 | Finger ............................ | 704/7 |
| 5,907,326 A | * | 5/1999 | Atkin et al. ................. | 345/334 |
| 5,946,499 A | * | 8/1999 | Saunders ....................... | 707/5 |
| 6,138,086 A | * | 10/2000 | Rose et al. ..................... | 704/8 |
| 6,281,886 B1 | * | 8/2001 | Ranieri ....................... | 345/173 |
| 6,288,726 B1 | * | 9/2001 | Ballard ....................... | 345/468 |
| 6,324,500 B1 | * | 11/2001 | Amro et al. .................... | 704/8 |

FOREIGN PATENT DOCUMENTS

| | | | | |
|---|---|---|---|---|
| EP | 989499 A2 | * | 3/2000 | ........... G06F/17/21 |

OTHER PUBLICATIONS

Bishop, F., "Supporting Multilanguage Text Layouts and Complex Scripts with Windows NT," Microsoft Systems Journal, vol. 13 No. 11, pp. 57(11)(reprinted), Sep. 1998.*

Hall, W. S., "Internationalization in Windows NT, part 1: Programming with Unicode," Microsoft Systems Journal, vol. 9, pp. 57(12) (reprinted), Jun. 1994.*

Hall, W., "Internationalization in Windows NT, part II: Locales, Languages, and Resources," Microsoft Systems Journal, vol. 9 No. 7, pp. 55(18) (reprinted), Jul. 1994.*

* cited by examiner

Primary Examiner—Joseph H. Feild
Assistant Examiner—Jeffrey A. Rossi
(74) Attorney, Agent, or Firm—Marilyn Smith Dawkins; Bracewell & Patterson, L.L.P.

(57) ABSTRACT

For languages requiring bidirectional (left-to-right and right-to-left) text display support, a multi-field text string object encapsulates both a normal logical ordered version of the text string entered and a reverse ordered version in separate fields. A bidirectional-support property of the multi-field text string object is set based on whether the host system supports bidirectional text displays. In response to a display request, the multi-field text string object checks the bidirectional-support property. If bidirectional text display is supported, the multi-field text string object sets the field containing the normally-ordered character sequence for the text string as the display field. If bidirectional text display is not supported, the multi-field text string object sets the field containing the reverse-ordered character sequence for the text string as the display field. Display controls receiving the normally-ordered character sequence should display the text string with the proper directionality (right-to-left). Display controls receiving the reverse-ordered character sequence will display the display field contents with the incorrect directionality (left-to-right) but, as a result of the character sequence reversal, will effectively display the text string with the proper directionality. Bidirectional text may thus be displayed on systems which do not support bidirectional text display, using only conventional, left-to-right only directional display controls.

21 Claims, 3 Drawing Sheets

METHOD SYSTEM AND COMPUTER PROGRAM PRODUCT FOR STORING BI-DIRECTIONAL LANGUAGE DATA IN A TEXT STRING OBJECT FOR DISPLAY ON NON-BIDIRECTIONAL OPERATING SYSTEMS

RELATED APPLICATIONS

The present invention is related to the subject matter of the following commonly assigned, copending U.S. patent applications: Ser. No. 09/211,810 entitled "METHOD, SYSTEM, AND COMPUTER PROGRAM PRODUCT FOR PROVIDING A USER INTERFACE WITH ALTERNATIVE DISPLAY LANGUAGE CHOICES" and filed Dec. 15, 1998; Ser. No. 09/211,809 entitled "METHOD, SYSTEM AND COMPUTER PROGRAM PRODUCT FOR CAPTURING LANGUAGE TRANSLATION AND SORTING INFORMATION INTO A TEXT STRING CLASS" and filed Dec. 15, 1998; Ser. No. 09/211,808 entitled "METHOD, SYSTEM AND COMPUTER PROGRAM PRODUCT FOR SORTING TEXT STRINGS" and filed Dec. 15, 1998; now U.S. Pat. No. 6,389,386 Ser. No. 09/211,803 entitled "METHOD, SYSTEM AND COMPUTER PROGRAM PRODUCT FOR STORING TRANSLITERATION AND/OR PHONETIC SPELLING INFORMATION IN A TEXT STRING CLASS" and filed Dec. 15, 1998; Ser. No.09/211,799 entitled "METHOD, SYSTEM AND COMPUTER PROGRAM PRODUCT FOR ROTATING THROUGH A SEQUENCE OF DISPLAY STATES IN A MULTI-FIELD TEXT CLASS IN A GRAPHICAL USER INTERFACE" and filed Dec. 15, 1998; now U.S. Pat. No. 6,388,686 Ser. No. 09/211,802 entitled "METHOD, SYSTEM AND COMPUTER PROGRAM PRODUCT FOR CONTROLLING THE GRAPHICAL DISPLAY OF MULTI-FIELD TEXT STRING OBJECTS" and filed Dec. 15, 1998; Ser. No. 09/211,813 entitled "METHOD, SYSTEM AND COMPUTER PROGRAM PRODUCT FOR DISPLAYING THE CONTENTS OF ALL FIELDS IN A MULTI-FIELD TEXT STRING OBJECT" and filed Dec. 15, 1998; Ser. No. 09/211,801 entitled "METHOD, SYSTEM AND COMPUTER PROGRAM PRODUCT FOR DYNAMIC LANGUAGE SWITCHING N A MULTI-FIELD TEXT STRING OBJECT VIA MESSAGING" and filed Dec. 15, 1998; and Ser. No. 09/211,812 entitled "METHOD, SYSTEM AND COMPUTER PROGRAM PRODUCT FOR AUTOMATIC CHARACTER TRANSLITERATION IN A TEXT STRING OBJECT" and filed Dec. 15, 1998. The content of the above-referenced applications is incorporated herein by reference.

BACKGROUND OF THE INVENTION

1. Technical Field

The present invention relates in general to display of bidirectional text within a data processing system user interface and in particular to proper display of bidirectional text utilizing normal, left-to-right only directional display controls. Still more particularly, the present invention relates to employing a multi-field text string class to enable proper display of bidirectional text on both bidirectional and non-bidirectional systems.

2. Description of the Related Art

Multinational companies often run information system (IS) networks which span multiple countries spread around the globe. To maximize the usefulness of such networks, operations within each country tend to run in the local language of the country. Where possible, names of abstract objects in user applications are in the local language and match the local language organization, city, or human names which the abstract objects represent. In the case of system management software, often abstract objects would represent each of a global enterprise's local offices.

Transferring data from one system to another within such a multinational network presents numerous challenges. One obstacle which must be overcome is the transfer of human language directionality. Unlike English and many other languages, certain human languages are customarily written from right-to-left rather than from left-to-right, or may be written in either direction. Hebrew, for example, is conventionally written right-to-left.

For transnational data exchange, language directionality may be addressed in the manner in which the text is encoded. The Unicode specification, for example, assigns a directionality to characters and defines a complex algorithm for determining the proper directionality of text. If a right-to-left text string is encountered, a user agent conforming to the Unicode specification is required to apply the Unicode bidirectional algorithm to display the characters within that string. Similarly, the HyperText Markup Language (HTML) offers higher-level markup constructs which do the same thing, such as the "dir" attribute (which is distinct from the DIR element) and the "BDO" element.

Support for bidirectional ("bidi") text, or support for displaying text in either direction (right-to-left or left-to-right) depending on the cultural convention associated with the human language in which the text is written, is typically integrated into the operating system or application (e.g., browser), if provided at all. Normally bidi text cannot be displayed properly in the user interface of a non-bidi version of an operating system or application without implementation of specialized text display controls.

It would be desirable, therefore, to provide a mechanism allowing normal left-to-right only directional user interface display controls to properly display bidi text in a user interface.

SUMMARY OF THE INVENTION

It is therefore one object of the present invention to provide an improved method, system and computer program product for display of bidirectional text within a data processing system user interface.

It is another object of the present invention to provide a method, system and computer program product for proper display of bidirectional text in a data processing system user interface utilizing normal, left-to-right only directional display controls.

It is yet another object of the present invention to provide a method, system and computer program product for employing a multi-field text string class to enable proper display of bidirectional text on both bidirectional and non-bidirectional systems.

The foregoing objects are achieved as is now described. For languages requiring bidirectional (left-to-right and right-to-left) text display support, a multi-field text string object encapsulates both a normal logical ordered version of the text string entered and a reverse ordered version in separate fields. A bidirectional-support property of the multi-field text string object is set based on whether the host system supports bidirectional text displays. In response to a display request, the multi-field text string object checks the bidirectional-support property. If bidirectional text display is supported, the multi-field text string object sets the field containing the normally-ordered character sequence for the text string as the display field. If bidirectional text display is not supported, the multi-field text string object sets the field containing the reverse-ordered character sequence for the text string as the display field. Display controls receiving the normally-ordered character sequence should display the text string with the proper directionality (right-to-left). Display controls receiving the reverse-ordered character sequence will display the display field contents with the incorrect directionality (left-to-right) but, as a result of the character sequence reversal, will effectively display the text string with the proper directionality. Bidirectional text may thus be displayed on systems which do not support bidirectional text display, using only conventional, left-to-right only directional display controls.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
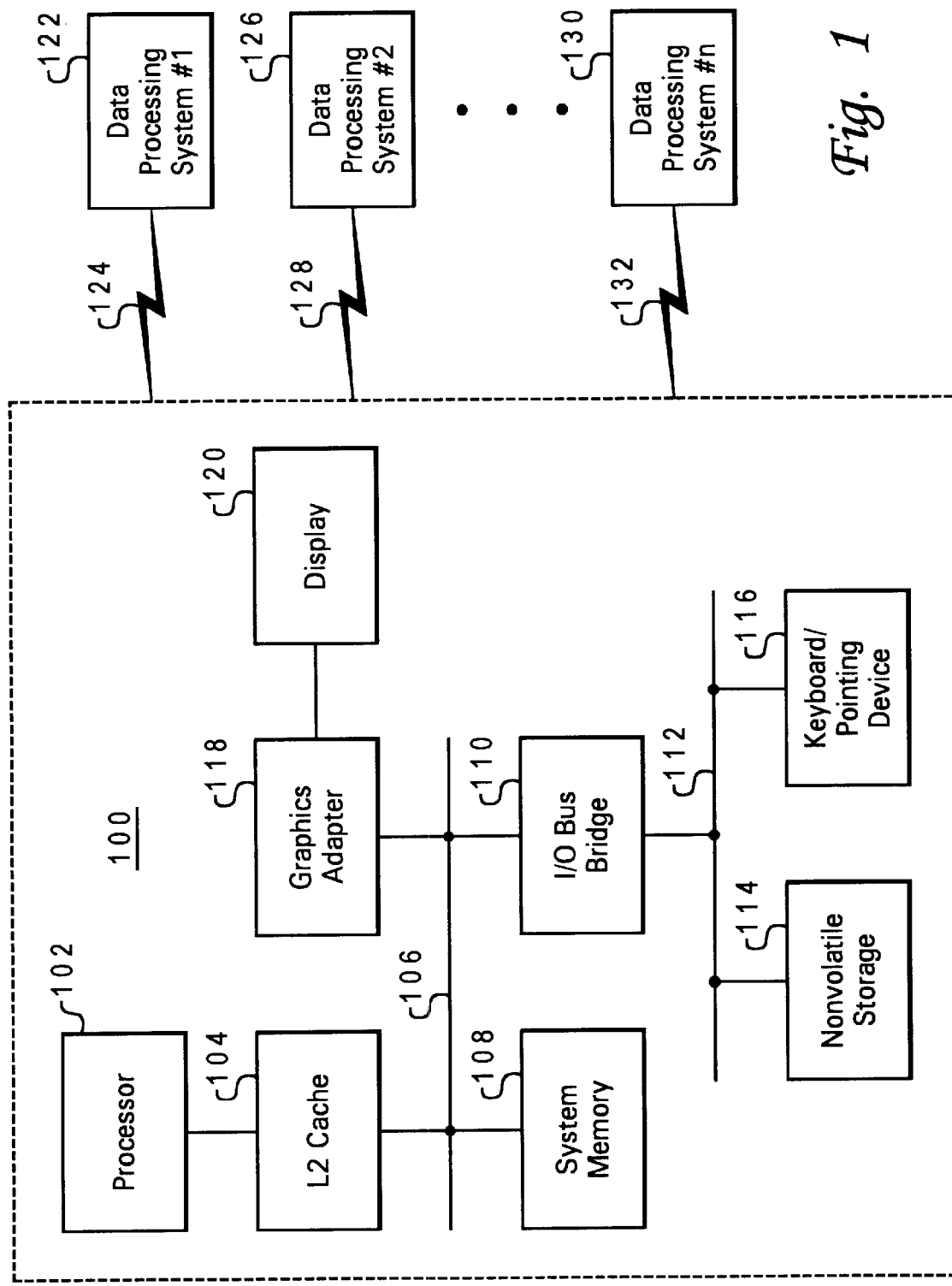
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. The data processing system network depicted includes a data processing system 100, which may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 116 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Data processing system 100 is coupled to data processing system 122 via communications link 124, to data processing system 126 via communications link 128, and to data processing system 130 via communications link 132. Data processing systems 122, 126, and 130 may exchange data including human language text such as files or system messages with data processing system 100. The human language text data transferred from any of data processing systems 122, 126, and 130 to data processing system 100 may include bidirectional language.

The data processing system network which is depicted and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
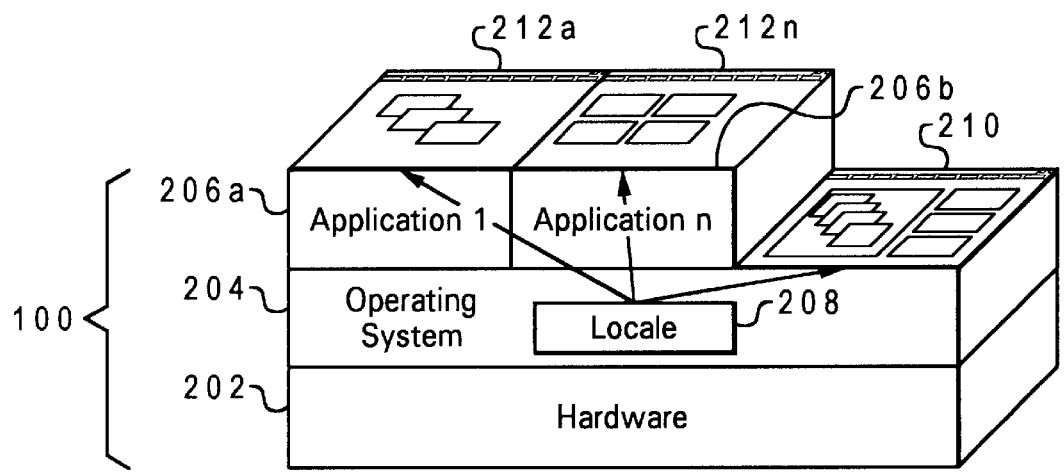
FIG. 2 is a functional diagram of a data processing system within a data processing system network in accordance with a preferred embodiment of the present invention.

Referring to FIG. 2, a functional diagram of a data processing system within a data processing system network in accordance with a preferred embodiment of the present invention is illustrated. As is known in the art, an operating system 204 runs on the hardware 202 making up data processing system 100. Hardware 202 includes the components depicted in FIG. 1 for data processing system 100. Operating system 204, as depicted in FIG. 2, is meant to include all software routines which control interaction with hardware 202, such as a basic input/output system (BIOS) allowing data reads and writes to a hard disk drive or other nonvolatile memory, as well as those software routines which enable an application to be utilized on data processing system 100. Operating system 204 may be, for instance, any of the Windows™ operating systems available from Microsoft Corporation of Redmond, Wash., including Windows NT.

In the preferred embodiment, data processing system 100 also includes an applications 206a–206n running on top of operating system 202. Applications 206a–206n may be distributed applications executing on a network or group of networks spanning different systems or platforms.

Applications 206a–206n in the exemplary embodiment preferably have some communication directly with operating system 204. Operating system 204 includes a locale property 208 specifying the cultural conventions employed for display of text within the user interface 212 of operating system 204 and the user interfaces 212a–212n of applications 212a–212n. Locale property 208 preferably specifies cultural conventions relating to directional display of user interface text.

In the present invention, a language property (not shown) may be employed in addition to locale property 208 and the structure of the cultural support features may be split between the locale property 208 and language property. Locale property 208 may be employed to support cultural conventions such as regional holidays and religious dates, observance of daylight savings time, etc., and display formatting of currency, numbers, dates, and the like, while the language of user interface and system message text is based on the language property. In a preferred embodiment, locale property 208 contains a upper-case, two letter ISO Locale Code as defined by ISO-3166 (e.g., "US" for United States or "JP" for Japan). Locale property 208 is employed in conjunction with a multi-field text string object as described below to enable display of bidirectional language text on systems which do not support bidirectional text display.

Figure 3:
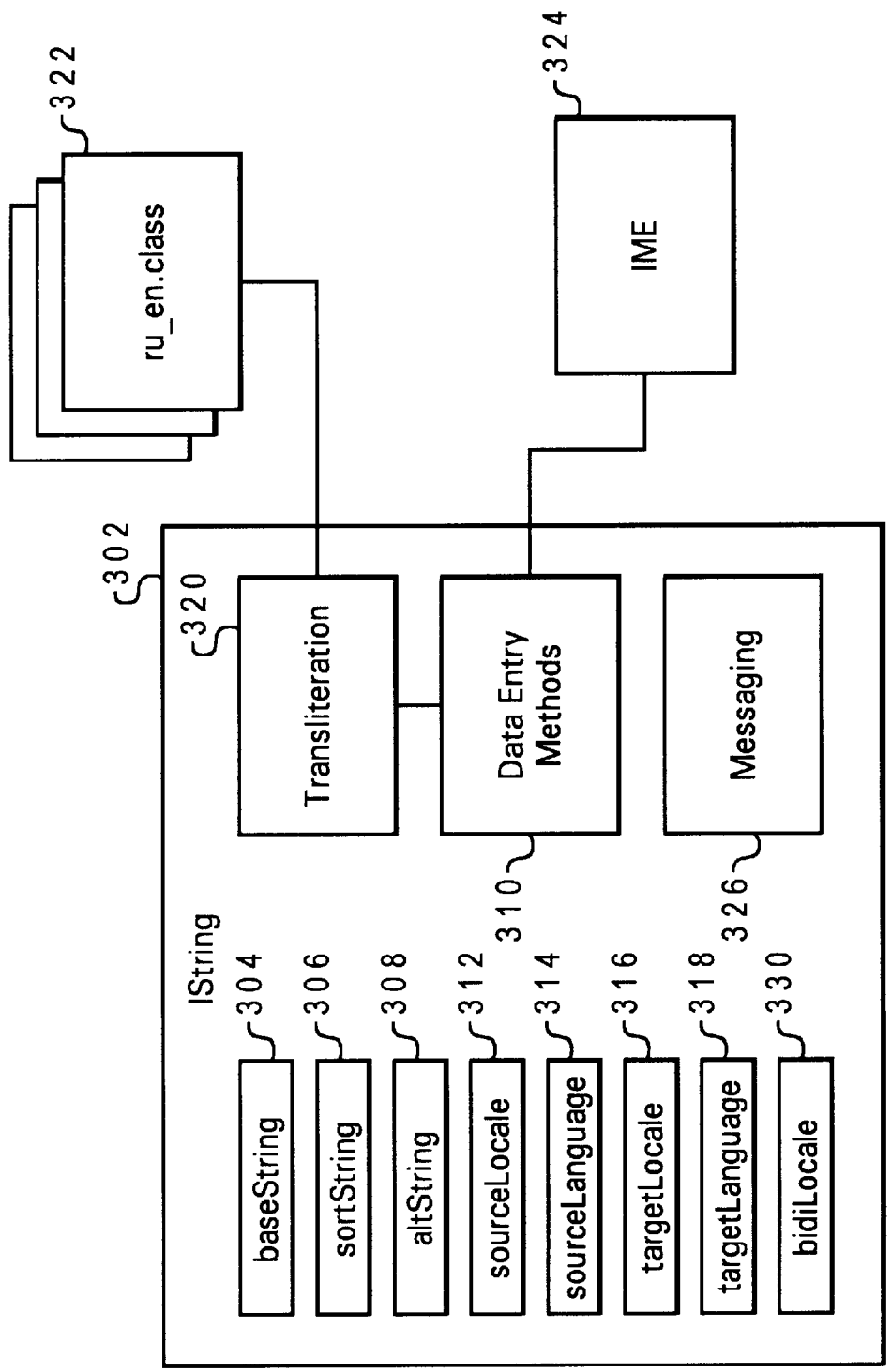
FIG. 3 depicts a diagram of a multi-field text string class employed in supporting display of bidirectional text on both bidirectional and non-bidirectional systems in accordance with a preferred embodiment of the present invention.

With reference now to FIG. 3, a diagram of a multi-field text string class employed in supporting display of bidirectional text on both bidirectional and non-bidirectional systems in accordance with a preferred embodiment of the present invention is depicted. International String Control ("IString") class 302 may be utilized in conjunction with the language property described above, particularly within data processing system networks spanning multiple countries around the globe. A fundamental problem in multinational computing environments which need to display or process data in multiple human languages is that a representation in one human language may become meaning-less as the data migrates to a system running in a different human language. A need exists, therefore, to capture alternative human language representations. This need is satisfied by IString class 302.

IString class 302 is preferably a Java class similar to the Java String class, which behaves like the String class by including similar methods. Most of the original behavior of the String class should be preserved, with additional functionality added and utilized only as needed. IString class 302 is a datatype which captures some of the meaning of spoken words which is normally lost when the word is reduced to a visual representation. IString class 302 is preferably utilized for all object names and system messages within a system.

The IString class 302 structure includes three different strings for each name, message, data, or text object: a baseString 304, a sortString 306, and an altString 308. BaseString 304 is the string within IString class 302 employed by default in the user interface display and may contain any text, usually the original text entered by the user in the local language where the IString object is created. SortString 306 may also be any text and is employed to allow correct sorting of non-phonetic languages and languages which are difficult to sort based only on the binary value of basestring 304. AltString 308 may be any text but should conventionally be filled with a latin character set representation of the pronunciation of the data contained in basestring 304. Thus, IString class 302 includes the original text (basestring 304), a sort key (sortString 306), and a pronunciation key (altString 308) for object names, system messages, and other data.

When implemented in Java, a constructor for an IString class 302 object may be composed of the following fields:
/** The base text String */ protected String baseString;
/** The related text String for proper collation */ protected String sortString;
/** The related alternate text String (pronunciation key) */ protected String altString;
/** The source locale, as an ISO-3166 code; used for collation */ protected String sourceLocale;
/** The source language, as an ISO-639 code */ protected String sourceLanguage;
/** The source variant defined for EBCIDIC and case mapping */ protected String sourceVariant;
/** The target locale, as an ISO-3166 code */ protected String targetLocale;
/** The target language, as an ISO-639 code */ protected String targetLanguage;
/** The target variant defined for EBCIDIC and case mapping */ protected String targetVariant;
/** The bidi support, either "true" or "false" */ protected String bidiLocale;

Complete listings of the upper-case, two letter ISO Country Codes defined by ISO-3166 and the lower-case, two letter ISO Language Codes defined by ISO-639 are readily available from a variety of sources on the Internet.

Table I illustrates how data within the IString data type 302 looks when represented as a table:

TABLE I

| Field | Type | Data |
|---|---|---|
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| targetLocale | Java String | ISO-3166 code, example "JP" |
| targetLanguage | Java String | ISO-639 code, example "ja" |
| bidiLocale | Java String | bidi support code |

The input of data into fields baseString 304, sortString 306 and altString 308 by data input methods 310 with data derived from transliteration engine 320 or input method editor (IME) 324, and the display and manipulation of the contents of basestring 304, sortString 306 and altString 308 with or without messaging methods 326, as well as the operation of IString 302 with respect to those fields for different values of sourceLocale field 312, sourceLanguage field 314, targetLocale field 316, and targetLanguage 318, are described in greater detail in the related applications. For the sake of clarity, those subjects will not be again described herein.

In the present invention, IString class 302 includes bidiLocale field 330, which contains either a "true" value or a "false" value. The bidiLocale field 330 is set based on the locale property of the underlying operating system, which specified whether bidirectional text display is supported. If the operating system locale property does not directly specify whether bidirectional text display is supported, a lookup table of locales for each operating system may be necessary to properly set the value of bidiLocale field 330. Alternatively, however, in the absence of specification by the operating system of whether bidi text is supported, bidiLocale property 330 may be set to a default value of "false" and the normal, left-to-right only directional display controls of the operating system may be employed to display the bidirectional text properly.

In the present invention, text strings entered into IString class 302 in a language (specified by sourceLanguage field 314) for which bidirectional support is required, baseString field 304 will contain the entered bidi text string in its logical order, which is the normal method of storing such data. The sortString field 306 will be employed to store the entered bidi text string in reverse order. The altString field 308 will contain an English transliteration of the entered bidi text.

When a display request for the data stored within IString class 302 is received, the IString class 302 checks the value of bidiLocale field 330. If bidiLocale field 330 is set to "true", the contents of baseString 304 are returned in response to the display request. However, if bidiLocale field 330 is set to "false", the contents of sortString 306 are instead returned in response to the display request.

Because both the normal logical order and the reverse order of an entered bidi text string is encapsulated within IString class 302, the entered bidi text string will be properly displayed regardless of whether bidirectional text display is enabled or not. If bidirectional text display is supported, the normal logical order of a right-to-left text string is presented from baseString 304 to the display control. The text control should then display the string from right-to-left. If bidirectional text display is not supported, however, the reverse ordered text string is presented from altString 306 to the display control, which should display the reverse-ordered string from left-to-right, thus effectively displaying the text string from right-to-left.

An example of employing the IString class 302 in the manner described above is set forth below:

// 
// Hebrew calendar
//
// The following is IString data using the IString constructor
// The fields are laid out and used as follows:
// baseString—correct Hebrew; sortString—reversed Hebrew;
// altString—English transliteration
//
new IString("\u05 ea\u05e9\u05e8\u05d9", "\u05d9\u05e8\u05e9\u05ea", "Tishrei", new Locale ("iw", "IW"), new Locale ("en", "US")),
new IString("\u05d7\u05e9\u05d5\u05df", "\u05df\u05d5\u05e9\u05d7", "Heshvan", new Locale ("iw", "IW"), new Locale ("en", "US")),
new IString("\u05db\u05e1\u05dc\u05d5", "\u05d5\u05dc\u05e1\u05db", . . . "Kislev", new Locale ("iw", "IW"), new Locale ("en", "US")), Only three month names are addressed in the above example, but the remaining Hebrew month names may be similarly addressed. In the first two fields (baseString and sortString) of each IString month name, Unicode Hebrew characters are specified. Thus, for example, the first IString month name would contain "י ר ש ת" in the basestring field and "ת ש ר י" in the sortString field. The altString field contains the English transliteration of the baseString field contents, or the month name in English.

Display code for passing the correct field of an IString month name to a display showing a calendar might be:

```
IString isMonth = resource.getIstring("Tishrei");
if (bidiLocale = = true)    // display real bidi on bidi system
    buttonMonth.setText(isMonth.getBaseString());
else                         // reverse the bidi on non bidi systems
    buttonMonth.setText(isMonth.getSortString());
```

The value of "isMonth" may then be passed to the display control requesting the month name. If bidirectional text display is supported, the value passed will be the contents of basestring 304; otherwise the value passed will be the contents of sortString 306.

The use of sortString 306 to store a reverse order version of a bidirectional text string in the present invention need not interfere with the use of sortString 306 for other functions. The functionality of storing a reverse-order text string in sortString 306 may be limited to languages requiring bidirectional text support. Sort algorithms depending on sortString 306 may check the sourceLanguage 314 and reverse the contents of sortString 306 if the language identified requires bidirectional support.

Figure 4:
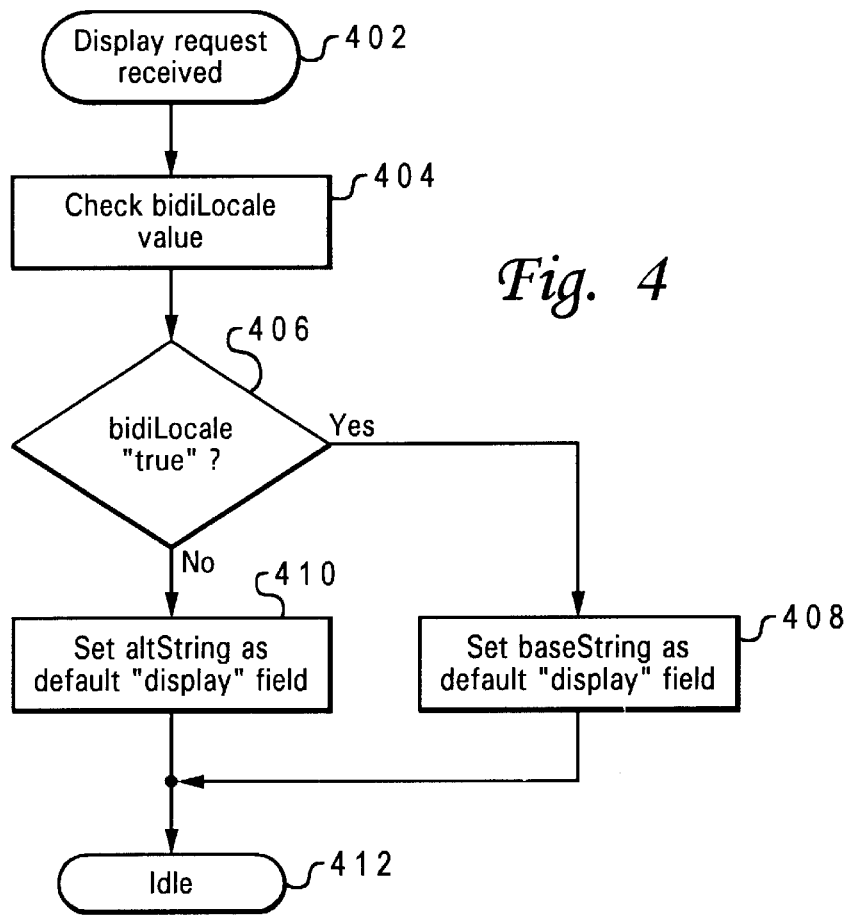
FIG. 4 is a high level flowchart for a process of employing a multi-field text string class to support display of bidirectional text on both bidirectional and non-bidirectional systems in accordance with a preferred embodiment of the present invention.

Referring to FIG. 4, a high level flowchart for a process of employing a multi-field text string class to support display of bidirectional text on both bidirectional and non-bidirectional systems in accordance with a preferred embodiment of the present invention is illustrated. The process begins at step 402, which illustrates a display request being received for bidirectional text encapsulated in a multi-field text string (IString) object.

The process passes next to step 404, which illustrates checking the value of the bidiLocale property for the subject IString object, and then to step 406, which depicts a determination of whether the IString bidiLocale property is "true". If so, the process proceeds to step 408, which illustrates setting the baseString field of the subject IString object as the default display field for the subject IString object. The display control making the display request, which supports bidirectional text, will therefore receive the normal logical ordered contents in the baseString field and should then display the retrieved contents in a right-to-left fashion, which is the proper directionality.

Referring back to step 406, if the IString bidiLocale property is not "true", the process proceeds instead to step 410, which illustrates setting the sortString field of the subject IString object as the default display field. The display control making the display request, which in this case does not support bidirectional text display, will receive the reverse ordered contents of the sortString field which it should then display in a left-to-right fashion. Since the ordering is reversed, however, the display control will effectively display the text string in right-to-left fashion, which is the proper directionality.

From either of steps 408 or 410, the process passes next to step 412, which illustrates the process becoming idle until another display request is received for a bidirectional text string encapsulated in a IString class object in accordance with the present invention.

It should be noted that the exemplary embodiment employs the operating system or application support for bidirectional text display as the criteria for determining which field to set as the default display field. Typically a display control within an application or operating system which supports bidirectional display will also support bidirectional display. However, should a display control which is within an application or operating system which supports bidirectional display NOT support bidirectional display, the criteria for selecting the default display field may be based accordingly. Thus, both the operating system and the display control may be examined to determine if support for bidirectional text display is available.

The present invention allows bidirectional text to be displayed on a system which does not support bidirectional text display, using only the left-to-right only directional display controls which should be available on any system. Additionally, the present invention allows bidirectional text strings to migrate from system to system, with the text string being displayed properly on all systems regardless of whether bidirectional text display is supported.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of displaying text, comprising:
   receiving a display request for a text string within a multi-field text string object, wherein the multi-field text string object includes a first field containing a normally-ordered character sequence for the text string and a second field containing a reverse-ordered character sequence for the text string, said reverse-ordered character sequence being a reverse-ordered identical copy of said normally-ordered character sequence;
   determining whether a display control originating the display request supports bidirectional text display; and
   responsive to determining that the display control does not support bidirectional text display, setting the second field of the multi-field text string object as the default display field.

2. The method of claim 1, further comprising:
   responsive to determining that the display control supports bidirectional text display, setting the first field of the multi-field text string object as the default display field.

3. The method of claim 1, wherein the step of receiving a display request for a text string within a multi-field text string object further comprises:
   receiving the display request from a display control which supports bidirectional text display.

4. The method of claim 1, wherein the step of receiving a display request for a text string within a multi-field text string object further comprises:
   receiving the display request from a display control which does not support bidirectional text display.

5. The method of claim 1, wherein the step of determining whether a display control originating the display request supports bidirectional text display further comprises:
   determining whether a host operating system supports bidirectional text display.

6. The method of claim 1, wherein the step of determining whether a display control supports bidirectional text display further comprises:
   checking a bidirectional support property of the multi-field text string object which is set based on whether the host operating system supports bidirectional text display.

7. The method of claim 1, wherein the step of determining whether a display control supports bidirectional text display further comprises:
   checking a bidirectional support property of the multi-field text string object which is set based on whether the display control supports bidirectional text display.

8. The method of claim 1, further comprising:
   during data entry of a bidirectional text string, storing the text string as entered by a user in the first field of the multi-field text string object as the normally-ordered character sequence, automatically generating the reverse-ordered character sequence for the text string entered by the user, and storing the reverse-ordered character sequence in the second field of the multi-field text string object.

9. The method of claim 1, further comprising:
   displaying the reverse-ordered character sequence for the text string in a directionality associated with a display of said normally-ordered character sequence.

10. A system for displaying text, comprising:
    a host system receiving a display request for a text string within a multi-field text string object, wherein the multi-field text string object includes a first field containing a normally-ordered character sequence for the text string and a second field containing a reverse-ordered character sequence for the text string, said reverse-ordered character sequence being a reverse-ordered identical copy of said normally-ordered character sequence; and
    display field selection logic within the host system, wherein the display field selection logic:
      determines whether a display control originating the display request supports bidirectional text display; and
      responsive to determining that the display control does not support bidirectional text display, sets the second field of the multi-field text string object as the default display field.

11. The system of claim 10, wherein the display field selection logic, responsive to determining that the display control supports bidirectional text display, sets the first field of the multi-field text string object as the default display field.

12. The system of claim 10, further comprising:
    a display control which supports bidirectional text display within the host system and originating the display request.

13. The system of claim 10, further comprising:
    a display control which does not support bidirectional text display within the host system and originating the display request.

14. The system of claim 10, further comprising:
    a host operating system property within the host system specifying whether the host system supports bidirectional text display, wherein the display field selection logic checks the host operating system property.

15. A computer program product within a computer usable medium for displaying text, comprising:
    instructions for receiving a display request for a text sting within a multi-field text string object, wherein the multi-field text string object includes a first field containing a normally-ordered character sequence for the text string and a second field containing a reverse-ordered character sequence for the text string, said reverse-ordered character sequence being a reverse-ordered identical copy of said normally-ordered character sequence;
    instructions for determining whether a display control originating the display request supports bidirectional text display; and
    instructions, responsive to determining that the display control does not support bidirectional text display, for setting the second field of the multi-field text string object as the default display field.

16. The computer program product of claim 15, further comprising:
    instructions, responsive to determining that the display control supports bidirectional text display, for setting the first field of the multi-field text string object as the default display field.

17. The computer program product of claim 15, wherein the instructions for receiving a display request for a text string within a multi-field text string object further comprise:

instructions for receiving the display request from a display control which supports bidirectional text display.

18. The computer program product of claim 15, wherein the instructions for receiving a display request for a text string within a multi-field text string object further comprise:

instructions for receiving the display request from a display control which does not support bidirectional text display.

19. The computer program product of claim 15 wherein the instructions for determining whether a display control originating the display request supports bidirectional text display further comprise:

instructions for determining whether a host operating system supports bidirectional text display.

20. A data structure stored on a computer usable medium, said data structure comprising:

a first field containing a normally-ordered character sequence for a text string;

a second field containing a reverse-ordered character sequence for the text string, said reverse-ordered character sequence being a reverse-ordered identical copy of said normally-ordered character sequence; and a default display field set to the first field if a host system supports bidirectional text display and set to the second field if the host system does not support bidirectional text display.

21. The data structure of claim 20, further comprising:

a property specifying whether the host system supports bidirectional text display.

* * * * *